(12) United States Patent
Sulkowski et al.

(10) Patent No.: US 11,111,944 B2
(45) Date of Patent: Sep. 7, 2021

(54) CLIP HAVING TWO INTERLOCKING PARTS IMPROVING RETENTION FORCE

(71) Applicants: Michael W Sulkowski, Commerce Township, MI (US); Joseph A Casilio, Troy, MI (US); Sami R Oweis, Rochester Hills, MI (US)

(72) Inventors: Michael W Sulkowski, Commerce Township, MI (US); Joseph A Casilio, Troy, MI (US); Sami R Oweis, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/554,836

(22) Filed: Aug. 29, 2019

(65) Prior Publication Data
US 2021/0062850 A1 Mar. 4, 2021

(51) Int. Cl.
*F16B 21/06* (2006.01)
*F16B 2/22* (2006.01)

(52) U.S. Cl.
CPC .............. *F16B 21/065* (2013.01); *F16B 2/22* (2013.01)

(58) Field of Classification Search
CPC ................................ F16B 2/22; F16B 21/065
See application file for complete search history.

(56) References Cited

U.S. PATENT DOCUMENTS

| | | | | |
|---|---|---|---|---|
| 4,122,583 A * | 10/1978 | Grittner | .............. | B60R 13/0206 24/297 |
| 5,716,161 A * | 2/1998 | Moore | .................... | F16B 5/065 24/453 |
| 2004/0244156 A1 * | 12/2004 | Jackson, Jr. | ........ | B60R 13/0206 24/295 |
| 2005/0271492 A1 * | 12/2005 | Jackson, Jr. | ............ | F16B 37/02 411/112 |
| 2008/0134472 A1 * | 6/2008 | Kosidlo | ................ | F16B 19/004 24/293 |
| 2010/0072735 A1 * | 3/2010 | Kirchen | .................. | F16B 5/065 280/728.2 |
| 2010/0146747 A1 * | 6/2010 | Reznar | .................... | F16B 5/125 24/457 |
| 2012/0240363 A1 * | 9/2012 | Lee | ....................... | F16B 21/076 24/297 |
| 2012/0272487 A1 * | 11/2012 | Cooley | ................. | F16B 5/0657 24/289 |
| 2013/0133162 A1 * | 5/2013 | Kuhm | ....................... | F16B 2/20 24/458 |
| 2017/0009789 A1 * | 1/2017 | Scherer | ................ | F16B 21/086 |
| 2019/0031248 A1 * | 1/2019 | Rogge | ................... | F16B 21/076 |
| 2019/0048907 A1 * | 2/2019 | Sugiyama | ............. | F16B 21/075 |
| 2019/0078602 A1 * | 3/2019 | Shinozaki | ........... | F16B 19/1081 |

* cited by examiner

*Primary Examiner* — Robert Sandy
*Assistant Examiner* — David M Upchurch
(74) *Attorney, Agent, or Firm* — Ralph E. Smith

(57) ABSTRACT

The clip retention assembly includes a base for attaching to a surface. The base includes a body, one or more snaps and a retaining member such that the surface is positioned between the one or more snaps and the retaining member to secure the base to the surface. A cap moves on the body from a released position to a retention position. The cap includes a head, a plurality of second snaps for retaining the cap on the base and a core. The core extends through the base body such that in the cap retention position the core is adjacent the base one or more snaps to prevent deflection.

10 Claims, 2 Drawing Sheets

CLIP HAVING TWO INTERLOCKING PARTS IMPROVING RETENTION FORCE

FIELD

The present disclosure generally relates to clip retention and, more particularly, to a clip with two parts that improves the retention force.

BACKGROUND

In the automotive industry, clips are utilized for various features. Generally, various types of clips exist that are positioned into apertures in the vehicle sheet metal body. Snapping clips used on striker plates have little or no relationship between the ease of installation versus the retention force needed to hold it in place. This means that when the retention force needed is high, the installation force is also high. An application that allows easy installation while giving back enough retention force to hold the snapping clips in place is not present.

Various solutions include a twist or snapping fixture to provide a relatively confident installation. Other solutions include fasteners to hold the clip in place such as by screws, rivets or Christmas tree clips. The above snapping clips are susceptible to flex where the clip can be unintentionally removed. The twist methods require a unique mounting hole. Fasteners require extra effort and time of assembly as well as extra costs and add weight to the vehicle.

The present disclosure provides a clip that overcomes the deficiencies of the prior art. The present device provides a locking feature to prevent flex and also increase the retention force of the part. Additionally, in an unlocked position, tabs exhibit the flex to provide easy installation into the surface aperture.

SUMMARY

According to the present disclosure, a clip retention assembly comprises a first base to attach to a surface aperture. The base includes a body, one or more snaps and a retaining member. The surface is positioned between the one or more snaps and the retaining member to secure the base to the surface. A cap moves on the body from a released position to a retention position. The cap includes a head, a plurality of second snaps to retaining the cap on the base and a core. The core extends through the base body such that in the clip retention position, the core is adjacent the retaining member, one or more snaps to prevent deflection. The base retention member is a ring coupled with the body. The one or more snaps project from the ring. The one or more snaps include a barb to position the surface between the ring and the barb. The base body has a cylindrical shape with a through bore. The core is positioned in the through bore. The cap second snaps are positioned circumferentially about the core. The plurality of second snaps couple with the ring in the retention position. The base body includes at least one retention prong. The cap plurality of snaps define at least one cutout to receive the at least one retention prong.

In accordance with a second embodiment, a switch striker comprises a base and a cap with a head to contact a switch. The base includes a body, one or more snaps and a retaining member. The surface is positioned between the one or more snaps and the retaining member to secure the base to the surface. A cap moves on the body from a released position to a retention position. The cap includes a head, a plurality of second snaps to retaining the cap on the base and a core. The core extends through the base body such that in the clip retention position, the core is adjacent the retaining member, one or more snaps to prevent deflection. The base retention member is a ring coupled with the body. The one or more snaps project from the ring. The one or more snaps include a barb to position the surface between the ring and the barb. The base body has a cylindrical shape with a through bore. The core is positioned in the through bore. The cap second snaps are positioned circumferentially about the core. The plurality of second snaps couple with the ring in the retention position. The base body includes at least one retention prong. The cap plurality of snaps define at least one cutout to receive the at least one retention prong.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
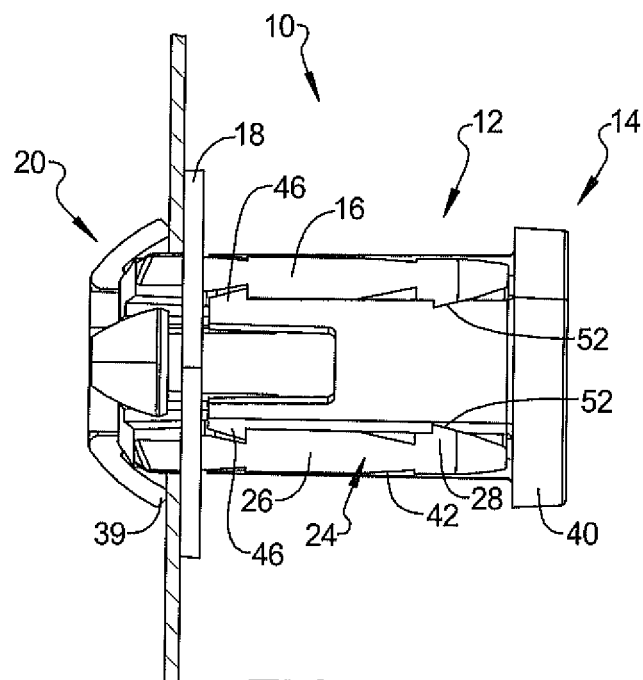
FIG. 1 is a perspective view partially in section of a clip assembly.
Figure 2:
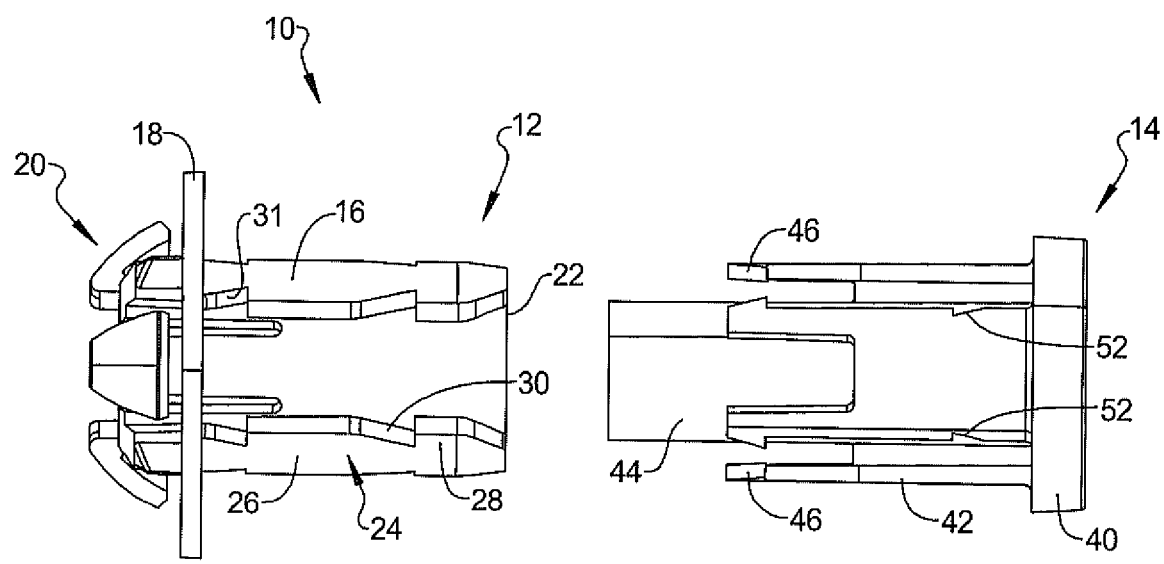
FIG. 2 is an exploded perspective view of the clip assembly.
Figure 3:
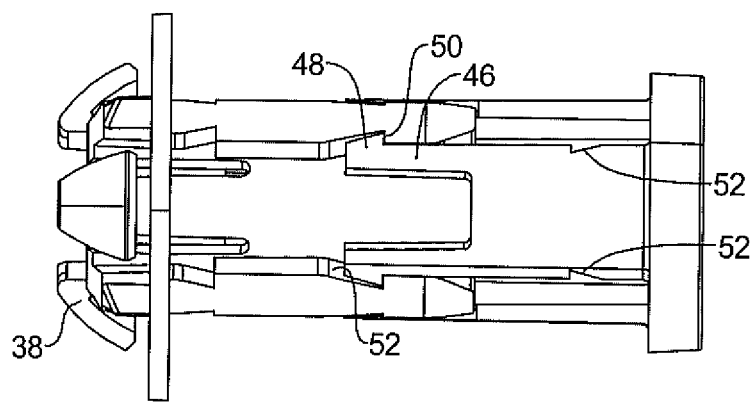
FIG. 3 is a side view of the clip assembly in a first position.
Figure 4:
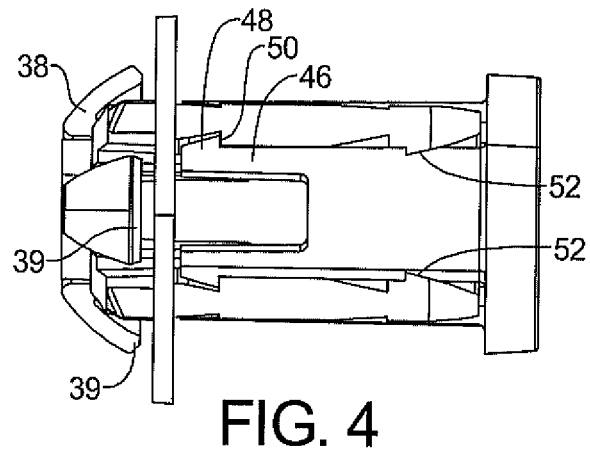
FIG. 4 is a side view of the clip assembly in a locked position.
Figure 5:
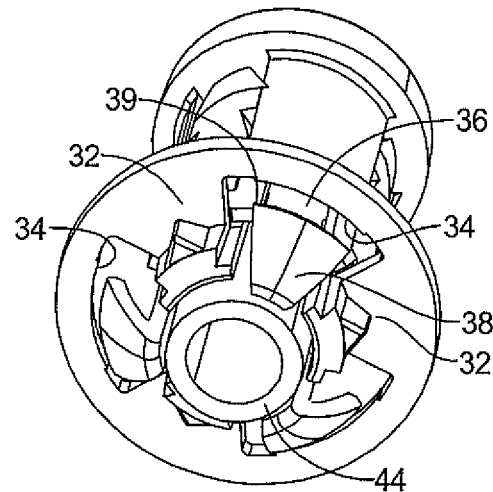
FIG. 5 is a bottom perspective view of the clip assembly.

Turning to the figures, a clip assembly is illustrated and designated with the reference numeral 10. The clip assembly 10 includes a base 12 and a cap 14. The base 12 and cap 14 are interconnected together as described.

The base 12 includes a body 16, a retention ring 18 and one or more snaps 20. The body 16 has an overall cylindrical shape with a through bore 22 passing through the body 16. Additionally, the body 16 includes a circumferential prong 24. There may be a plurality of prongs 24 on the exterior surface of the body 16. The prongs 24 have a body 26 and an arrow shaped head 28. A cutout 30 is formed between the base 26 and head 28. A second cutout 31 is formed at the bottom of the prong 24.

A plurality of supports 32 extend from the body 16 to the retention ring 18. The supports 32 maintain the ring 18 with the body 16 and also provide securement of the ring 16. Apertures 34 are provided between the supports 32 and the body 16 along the ring 18.

One or more snaps 20 project from the ring 16. The snaps 20 include a base 36 extending away from the ring 16. The base 36 extends generally parallel to the body 16 of the base 12. A head 38 extends from the base 36. The head 38 provides a barb 39 to secure the working surface between the snaps 20 and the ring 16.

The snaps 20 are provided with a desired amount of flex to enable the base 12 to be positioned into an aperture in the sheet metal working surface. Thus, the snaps move radially inward to enable the base 12 to be positioned in the aperture on the sheet surface. Once the barbs 39 pass through the aperture, they extend radially outward capturing the sheet surface between the ring 16 and the head 38 as seen in FIG. 1.

The cap 14 includes a head 40 with a plurality of extending fingers 42 and a cylindrical core 44. The head 40 may be of any desired shape to provide a contact surface to abut a switch or the like. The fingers 42 each include a pair of second snaps 46. The snaps 46 include a head 48 with a barb 50. The barb 50 is positioned in the second cutout 31 to secure the cap 14 with the base 12 in a connected or locked position. Additionally, the finger 42 includes a cutout 52 to receive the head 28 of the prong 24. Thus, in the locked position, the base 12 and cap 14 are retained together at two positions.

The core 44 is positioned into the bore 22 in the body 16. The core 44, having a right cylindrical configuration, passes through the bore 22 and ultimately out through the ring 16 adjacent the snaps 20. The core 44 pushes the snaps 20 radially outward to eliminate their flex. Thus, with the core 44 of the cap 14 in the locked position, the snaps 20 are unable to flex and move radially inward. This locks the snaps 20 onto the sheet surface.

Thus, the present device provides a low assembly force to insert the snaps 20 into the sheet aperture while having a high retention force with the core 44 positioned within the snaps 20 to prohibit deflection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clip retention assembly comprising:
    a base for attaching to a surface, the base including a body, one or more snaps and a retaining member such that the surface is positioned between the one or more snaps and the retaining member to secure the base onto the surface; and
    a cap moving on the body from a released position to a retention position, the cap including a head, a plurality of second snaps engaging the base body for retaining the cap on the base and a core, the core extending through the base body such that in a retention position the core is adjacent the base one or more snaps to prevent deflection.

2. The clip retention assembly according to claim 1, wherein the retaining member is a ring coupled with the body.

3. The clip retention assembly according to claim 2, wherein the one or more snaps projects from the ring.

4. The clip retention assembly according to claim 3, wherein the one or more snaps include a barb for positioning the surface between the ring and the barb.

5. The clip retention assembly according to claim 1, wherein the base body has a cylindrical shape with a through bore.

6. The clip retention assembly according to claim 5, wherein the core is positioned in the bore.

7. The clip retention assembly according to claim 1, wherein the plurality of second snaps are positioned circumferential about the core.

8. The clip retention assembly according to claim 5, wherein the plurality of second snaps couple with cutouts on the base body in the retention position.

9. The clip retention assembly according to claim 1, wherein the body further comprising at least one retention prong.

10. The clip retention assembly according to claim 9, wherein second snaps define at least one cutout for receiving the at least one retention prong.

\* \* \* \* \*